United States Patent
Asadorian et al.

(10) Patent No.: US 11,057,331 B2
(45) Date of Patent: Jul. 6, 2021

(54) CONSTRUCTION OF GLOBAL INTERNET MESSAGE THREADS

(71) Applicant: salesforce.com, inc., San Francisco, CA (US)

(72) Inventors: Narek Asadorian, San Francisco, CA (US); Noah William Burbank, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/687,622

(22) Filed: Nov. 18, 2019

(65) Prior Publication Data

US 2021/0150482 A1 May 20, 2021

(51) Int. Cl.
*H04L 12/58* (2006.01)
*G06Q 10/10* (2012.01)

(52) U.S. Cl.
CPC ............ *H04L 51/16* (2013.01); *G06Q 10/10* (2013.01); *H04L 51/04* (2013.01); *H04L 51/36* (2013.01)

(58) Field of Classification Search
CPC ......... H04L 51/16; H04L 51/36; H04L 51/38; H04L 51/04; G06Q 10/107; H04W 4/12
See application file for complete search history.

(56) References Cited

U.S. PATENT DOCUMENTS

| | | | | |
|---|---|---|---|---|
| 5,452,430 A | * | 9/1995 | Dievendorff | G06F 5/065 711/170 |
| 9,002,725 B1 | * | 4/2015 | Carobus | G06Q 10/107 705/14.54 |
| 2011/0154338 A1 | * | 6/2011 | Ramanathaiah | G06Q 10/06 718/100 |
| 2013/0157699 A1 | * | 6/2013 | Talwar | H04L 51/38 455/466 |
| 2017/0111305 A1 | * | 4/2017 | Bastide | H04L 51/16 |
| 2018/0302344 A1 | * | 10/2018 | Roeder | H04L 51/00 |

* cited by examiner

*Primary Examiner* — Lance Leonard Barry
(74) *Attorney, Agent, or Firm* — Holland & Hart LLP

(57) ABSTRACT

Methods, systems, and devices supporting global message threads are described. A thread server may receive a communication message associated with a first set of user identifiers (e.g., the author and recipients of the message) and may extract a thread identifier from the message. The thread identifier may associate the message with one or more additional messages (e.g., from the same thread of messages), where the one or more additional messages may be associated with different user identifiers. The thread server may upsert the received communication message to a stored set of messages associated with a root indicating the thread identifier. If the thread server receives a query indicating the thread identifier from a user, the thread server may retrieve all of the messages associated with the thread identifier from persistent memory based on the query, including messages that are not associated with the user identifier for the querying user.

19 Claims, 12 Drawing Sheets

CONSTRUCTION OF GLOBAL INTERNET MESSAGE THREADS

FIELD OF TECHNOLOGY

The present disclosure relates generally to database systems and data processing, and more specifically to construction of global internet message threads.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some cloud platforms may support user activity events such as emails, meeting invitations, or other messages. Cloud platform users may be part of a group, and some activity events for each user may be presented to that user in a thread. For example, a user may view the messages (e.g., emails) exchanged between a first group of users and a second group of users if the user is included on the messages (e.g., as an author or recipient of the message). However, the user may not view the messages on which the user is not included. For example, a user—such as a group manager—may not be included on a message (e.g., as either the author or a recipient) and accordingly may not view the message, as the thread view for the user may be specific to that user's message inbox. Accordingly, the user may miss important information contained in messages that are exchanged between the first group of users and the second group of users but do not include the user. Additionally, analysis of the messages by the user may be inaccurate due to the user-specific message view.

DETAILED DESCRIPTION

Figure 1:
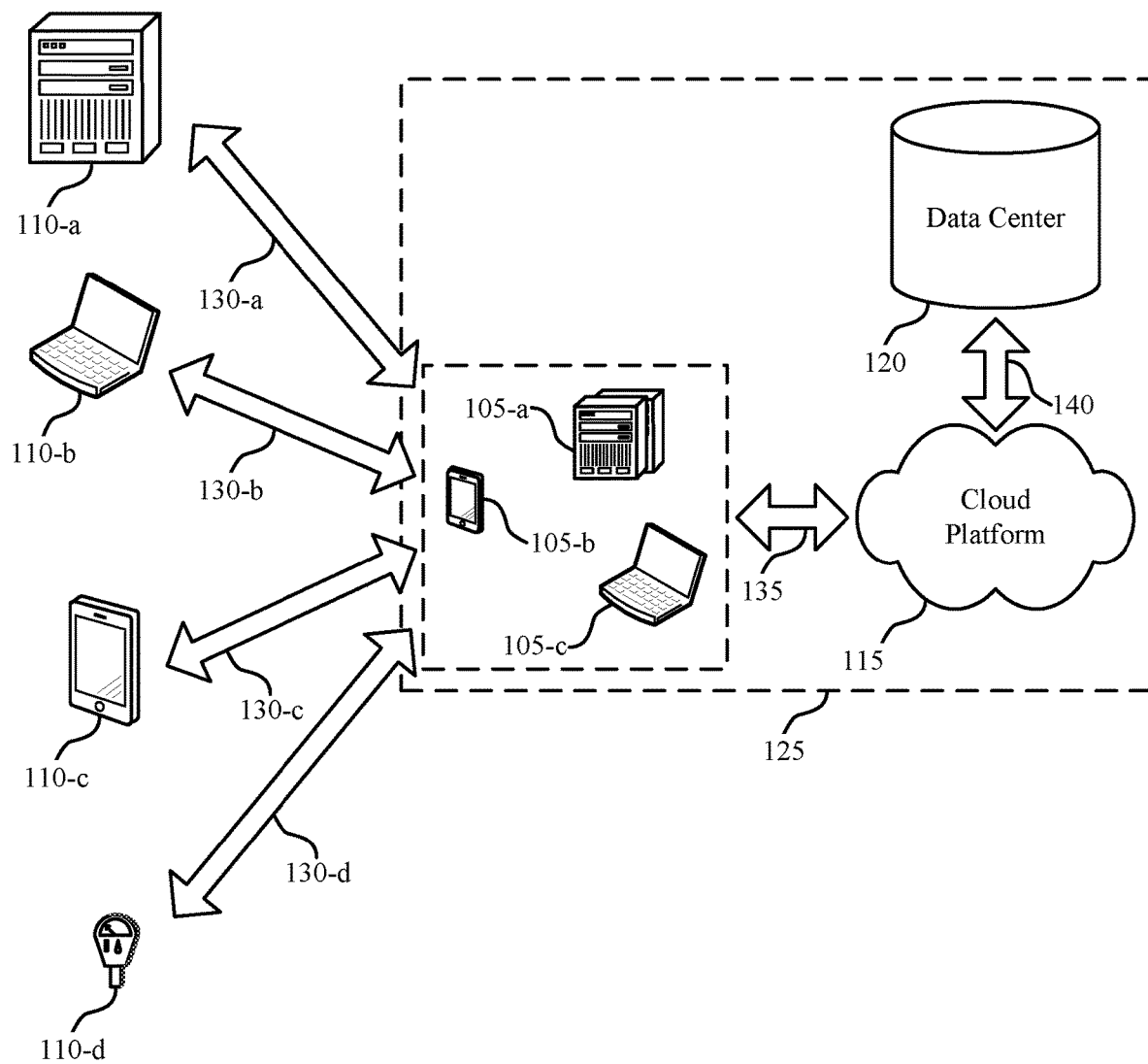
FIG. 1 illustrates an example of a system for persistent storage of global communication message information that supports construction of global internet message threads in accordance with aspects of the present disclosure.

Some cloud platforms may use group (e.g., global) threads to organize (e.g., store, display, etc.) messages. A thread may include messages (e.g., emails, calendar invites, instant messages, text messages, etc.) that are associated with users (e.g., senders, such as the author of the message; recipients, such as users in a recipient list or carbon copied (CC'd) on the message; etc.). In some examples, a first set of messages associated with a thread may be visible to a user, while a second set of messages associated with the thread may not be visible to the user. For example, a message associated with the thread may not be associated with the user (e.g., the user may be removed from the recipients list), and the message may accordingly not be visible to the user (e.g., in an inbox for the user). A message that is not visible to the user may cause the user to miss important information (e.g., a customer purchase) and/or engage in redundant work (e.g., send a duplicate message to a customer). In some cases, a message (e.g., an email) may be interpreted (e.g., classified). Interpreting a message without context may lead to an incorrect or inaccurate interpretation. In some examples, incorrectly or inaccurately interpreting a message may negatively affect individuals and/or organizations. For example, a first user may ask a customer if the customer is satisfied, and a second user may ask the same customer if the customer is not satisfied. The customer may reply to both the first and the second users with a short response message (e.g., "yes" or "no"), which may lead to an incorrect or inaccurate interpretation of the response message (e.g., as the same natural language text in the response messages may have drastically different meanings).

A message threading system may implement global (e.g., group) message threads to organize messages. Global message threads may improve system efficiency, reduce redundant work, improve message interpretation, or a combination thereof. A communication message may be received at a server, and the communication message may include a set of user identifiers. The set of user identifiers may be associated with transmitting the communication message (e.g., a message sender) or receiving the communication message (e.g., a message recipient). A thread identifier may be extracted from the communication message, and the thread identifier may be used in storing the communication message in persistent memory (e.g., a database, a solid state drive, a hard disk drive, etc.). In some examples, the communication message and/or metadata associated with the communication message may be stored in a data structure (e.g., a tree), and the thread identifier may indicate a tree root (e.g., a root node) associated with the message. If a tree root corresponding to the thread identifier is not identified in the persistent memory, a new tree may be created with a root that corresponds to the thread identifier. If a tree root corresponding to the thread identifier is identified, the communication message may be associated with (e.g., inserted into or upserted to) the tree. In some examples, one or more additional communication messages may be stored with the communication message. For example, the one or more additional communication messages may also be associated with the thread identifier, and the threading system may store the communication message with the one or more additional communication messages based on their common thread identifier (e.g., as part of the same data structure).

In some cases, a global message thread may be constructed and/or displayed based on one or more thread identifiers. For example, a query message may be received (e.g., from a user device), and the query message may indicate a thread identifier. In some cases, a data structure may be identified based on the thread identifier. Data (e.g., a communication message, communication message metadata, etc.) may be retrieved from persistent memory based on the thread identifier. In some cases, global message threads and/or the storage of communication messages associated with global message threads may improve system efficiency. For example, a user may efficiently retrieve all communication messages associated with a thread identifier, regardless of whether the user is included on the communication messages (e.g., whether the user is the author or a recipient of any particular message in the thread). Additionally or alternatively, storing communication messages in a graph (e.g., a tree) may support efficient graph operations (e.g., insert, delete, search, iterate, etc.). In some examples, the storage of communication messages in a tree with a root that is associated with a thread identifier may provide logarithmic run-time search complexity (e.g., $O(\log(n))$) with respect to the number of messages stored in the tree. In some additional or alternative cases, global message threads and/or the way in which communication messages are stored may improve message interpretations. For example, storing communication messages based on a thread identifier may provide message context in a comprehensive and efficient manner.

Aspects of the disclosure are initially described in the context of an environment supporting an on-demand database service. Aspects of the disclosure are further described with respect to a message storing system, a user device including a user interface, a threading platform, a message context derivation system, and a process flow. Aspects of the disclosure are further illustrated by and described with reference to apparatus diagrams, system diagrams, and flowcharts that relate to construction of global internet message threads.

FIG. 1 illustrates an example of a system 100 for persistent storage of global communication message information that supports construction of global internet message threads in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may support the construction of global internet message threads. In some cases, the data center 120 may include multiple databases, servers, or other types of systems. For example, the data center 120 may include a thread server and/or a data store. In some cases, the thread server may support the construction of global internet message threads. The cloud platform 115 or a thread server of subsystem 125 may store communication messages in a data store (e.g., in persistent memory). The thread server may receive a query message from a user device (e.g., a cloud client 105 or a contact 110) and may additionally or alternatively retrieve one or more communication messages from a data store. The construction of global internet message threads may support improved message storing, viewing, and interpretation.

In some other system, some messages associated with a thread may not be associated with a particular user, even if other messages associated with the thread are associated with the user. For example, the user may be removed from the recipients list for one or more messages of the thread, and the user correspondingly may not view the messages. In some cases, not viewing the messages may cause the user to miss important information (e.g., a customer purchase) and/or to engage in redundant work (e.g., send a duplicate message to a customer). In some cases, a message (e.g., an email) may be interpreted (e.g., classified). Interpreting a message without context may lead to an incorrect or inaccurate interpretation. In some examples, incorrectly or inaccurately interpreting a message may negatively affect individuals and/or organizations. For example, analyzing the contents of a message independent of its context may lead to inaccurate analysis results.

In contrast, the system 100 may implement the construction of global internet message threads, which may improve system efficiency, reduce redundant work, and improve message interpretation. A thread server of subsystem 125 may improve system efficiency by storing messages in a global thread. For example, the thread server may extract or otherwise identify a thread identifier associated with one or more messages and may store the one or more messages based on the thread identifier. A user device (e.g., a contact 110) may present a global thread (e.g., visually, audibly, tactilely, etc.) and thereby reduce redundant work. For example, the user device may provide a user with a global view of a message thread, enabling the user to quickly identify completed work or tasks that are associated with the thread. A thread server of subsystem 125 may improve message interpretation by providing and/or considering a global message context (e.g., scope). For example, the thread server may consider messages that are associated with different groups of users when interpreting (e.g., classifying using natural language processing (NLP) or other artificial intelligence (AI) techniques) a message, and thereby improve the interpretation of the message.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

The construction of global internet message threads may support global views of communications across a team of users. For example, users of computing and cloud platforms may work within teams, and the users may communicate with groups of end users (e.g., customers). In some cases, users may desire a team (e.g., global) perspective of communications associated with a group of end users. The team perspective may provide users with team-level information in a quick and reliable manner. For example, a user may receive a notification or indication that an end user replied to a message that was sent to the end user by a different team user. The user may view information association with the message in a global thread view, allowing the user to quickly and accurately respond to an end user reply in response to the message (e.g., even if the user does not send or receive the message or the end user reply).

Figure 2:
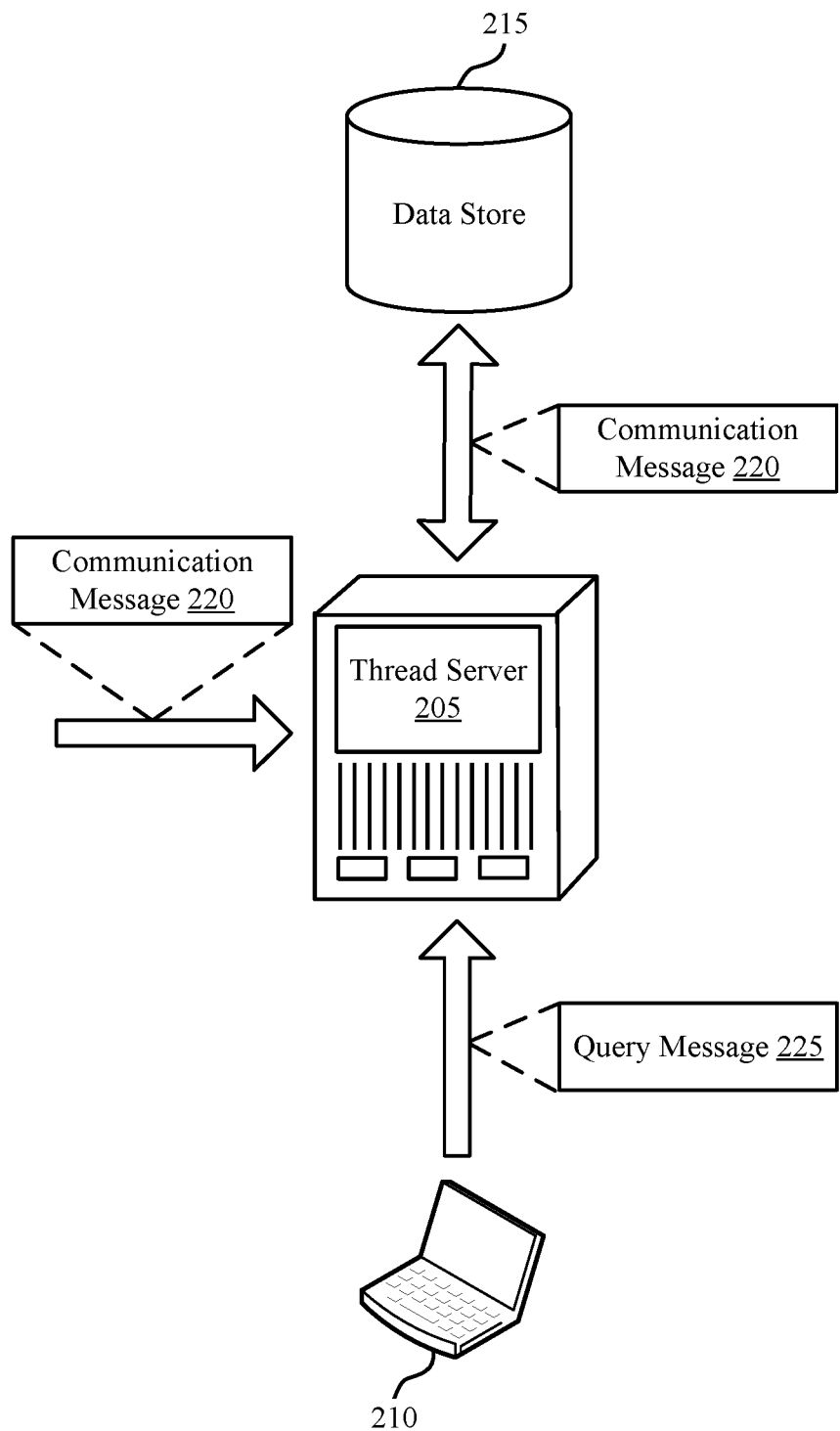
FIG. 2 illustrates an example of a message storing system that supports construction of global internet message threads in accordance with aspects of the present disclosure.

FIG. 2 illustrates an example of a message storing system 200 that supports construction of global internet message threads in accordance with aspects of the present disclosure. The message storing system 200 includes a thread server 205, a user device 210, and a data store 215. The message storing system 200 may implement aspects of a system 100 as described with reference to FIG. 1. For example, a thread server 205 and/or a data store 215 may be an examples or components of a data center 120. A user device 210 may implement aspects of subsystem 125 as described with reference to FIG. 1.

The thread server 205 may represent aspects of an application server, communication server, data processing server, database server, cloud-based server, server cluster, virtual machine, container, or some similar data processing device or system. The thread server 205 may communicate with other devices such as the data store 215 and/or the user device 210. The thread server 205 may receive a communication message 220 that includes a first set of user identifiers associated with transmitting (e.g., sending) and/or receiving the communication message 220. In some cases, the communication message 220 may be received from a user device (e.g., a user device 210), a server (e.g., a mail server), or some similar device or system. For example, the message storing system 200 may receive a stream of communication messages 220 in real-time (or pseudo-real-time) from multiple sources and the thread server 205 may process the stream of communication messages 220 in real-time (or pseudo-real-time). For example, the thread server 205 may extract a thread identifier from a communication message 220.

In some implementations, the thread server 205 may extract a thread identifier from metadata (e.g., header information) associated with the communication message 220. Additionally or alternatively, the thread server 205 may determine a thread identifier associated with the communication message 220 based on an automated analysis (e.g., a machine-learned or user-declared analysis) of data and/or metadata associated with the communication message 220. The thread identifier may associate the communication message 220 with one or more additional communication messages stored in persistent memory (e.g., a data store 215). For example, the communication message 220 and the one or more additional communication messages may all be part of a same group of messages descending from a same original message (e.g., along any chain of responses in the thread). In some cases, the one or more additional communication messages may include a second set of user identifiers associated with transmitting and/or receiving at least one of the one or more additional communication messages. The second set of user identifiers may be different from the first set of user identifiers.

The communication message 220 and the thread identifier may be stored in persistent memory (e.g., a data store 215). For example, the thread server 205 may store the thread identifier and communication message 220 or an indication of the communication message 220 in persistent memory. In some cases, the thread server 205 may identify a data structure (e.g., a graph) and/or a location (e.g., a root node) associated with the thread identifier and may store the communication message 220 in the identified data structure and/or location. Using the thread identifier to identify a data structure and/or a location may improve system performance. For example, identifying a root node based on a thread identifier may provide a constant run-time complexity for identifying a data structure for storing or retrieving the communication message 220.

A user device 210 may transmit a query message 225 to the message storing system 200. For example, the user device 210 may query the data store 215 (e.g., via the thread server 205 or via some other application programming interface (API)) for messages associated with the thread identifier for display or analysis. In some cases, the user device 210 may be associated with a user identifier of the second set of user identifiers, but not the first set of user identifiers. For example, a user of the user device 210 may have sent or received one or more messages in the thread corresponding to the thread identifier but may not have sent or received the communication message 220. Communication messages may be retrieved from the data store 215 based on the query message 225. In some examples, the thread server 205 (or another database mechanism) may retrieve one or more communication messages based on the query message 225 and/or the thread identifier. For example, the thread server 205 may retrieve the communication message and the one or more additional communication messages based on thread identifier indicated in the query message 225. In some cases, the thread server 205 may identify a root node of a tree based on the thread identifier and retrieve communication messages based on the identified root node. In some examples, the thread server 205 and/or the data store 215 may parse (e.g., iterate through) or otherwise analyze the data structure associated with the identified root node, which may improve system efficiency and user experience. For example, a tree traversal (e.g., an in-order traversal) may be performed to efficiently retrieve communication messages associated with the thread identifier in a desired order (e.g., chronologically by message timestamp). Storing communication messages in this manner may improve user experience by allowing a user to view communication messages (e.g., all communication messages) associated with a message thread in a desired order even if the user is not associated with (e.g., the author or a recipient of) one or more of the communication messages.

Figure 3:
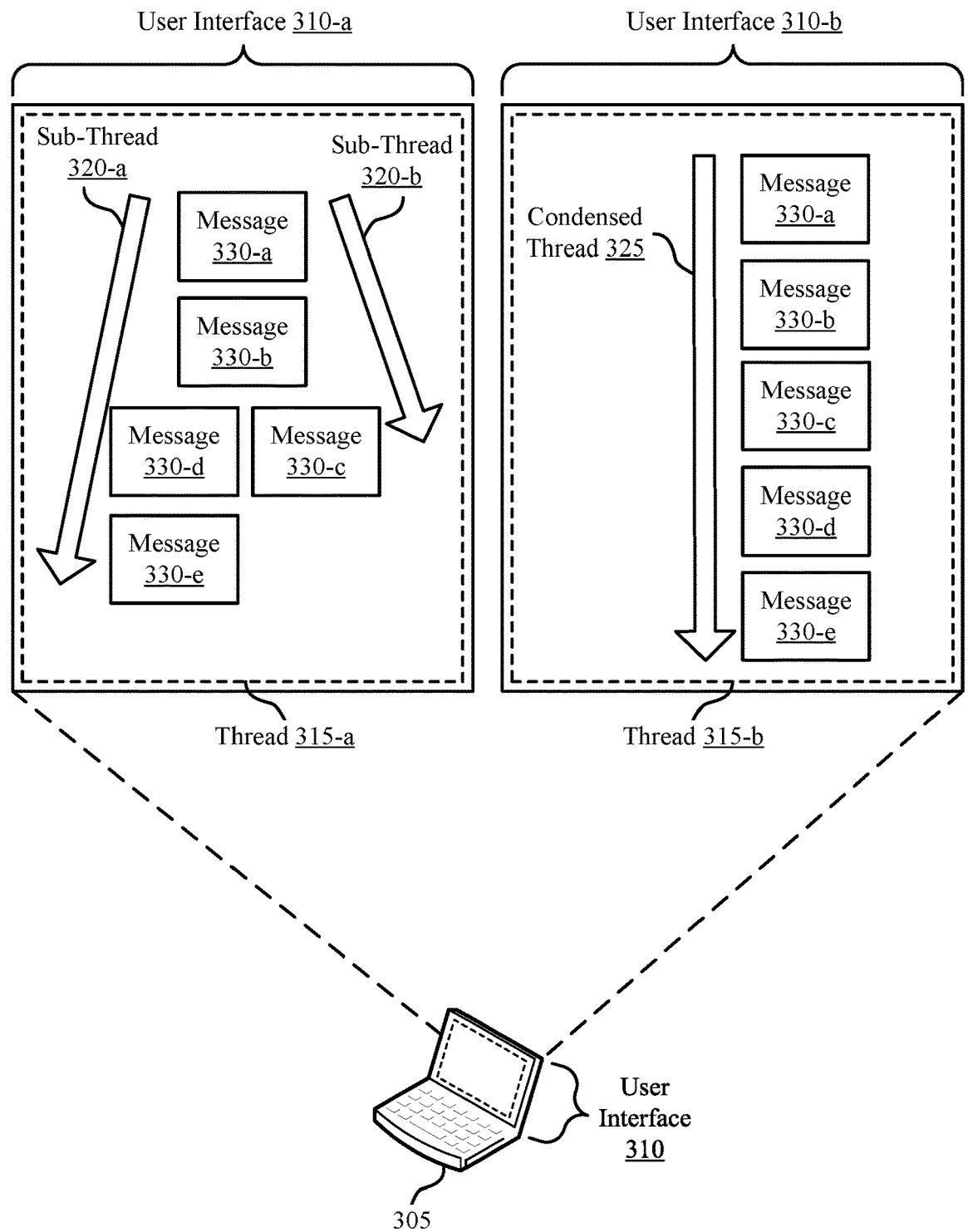
FIG. 3 illustrates an example of a user device including a user interface that supports construction of global internet message threads in accordance with aspects of the present disclosure.

FIG. 3 illustrates an example of a user device 305 including a user interface 310 that supports construction of global internet message threads in accordance with aspects of the present disclosure. In some cases, the user interface 310 may provide multiple data views. For example, user interface 310-a may display thread 315-a, sub-threads 320-a and 320-b (which may be referred to as "fibers" of the thread), and messages 330-a, 330-b, 330-c, 330-d, and 330-e (e.g., communication messages, such as emails, calendar invites, social media posts, forum posts, voice calls, short message service (SMS) text messages, or the like). User interface 310-b may display thread 315-b, condensed thread 325 (which may be referred to as a collapsed thread, a condensed fiber, or a "fibor"), and the messages 330-a, 330-b, 330-c, 330-d, and 330-e. In some cases, thread 315-a and thread 315-b may correspond to the same thread, but may be displayed differently on user interface 310-a and user interface 310-b. However, it is to be understood that the user interfaces 310 represent an example user interface, and other user interface configurations are supported by the techniques and processes described herein.

The user interfaces 310 may support global threads with reference to FIGS. 1 and 2. In some cases, a user may view and interact with a user interface 310 and gain an understanding of a thread 315 and the messages 330 associated with the thread. For example, thread 315-a and thread 315-b may correspond to different visualizations of the same thread containing the same messages 330 (e.g., communication messages, such as internet messages in an internet message format). In some cases, a user may view user interface 310-a to inspect the interactions between different groups of users in the thread 315-a. For example, the user may view user interface 310-a and observe sub-thread 320-a and sub-thread 320-b. In some examples, multiple sub-threads may indicate that one or more messages 330 have different user identifiers associated with the one or more messages 300. As illustrated by the structure of thread 315-a (e.g., two sub-threads 320, message 330-c and message 330-d both stemming from message 330-b, etc.) in user interface 310-a, the same set of users is included on messages 330-a and 330-b, but different sets of users are included on messages 330-c and 330-d. However, both messages 330-c and 330-d were sent in reply to message 330-b. The structure of a thread may provide useful information to a user, such as what types of messages create a split in a thread, what types of messages end a thread, which groups of users communicate most frequently, etc.

In some cases, a user may view user interface 310-b to obtain a temporal global view of thread 315-b. User interface 310-b may display the messages 330 in chronological order, regardless of whether the messages 330 are associated with the same user identifiers. For example, one or more user identifiers associated with message 330-c may be different than one or more user identifiers associated with message 330-d, but these messages 330 may be displayed in order based on message 330-c being associated with an earlier timestamp than message 330-d (i.e., the sub-threads 320-a and 320-b are interleaved in the condensed thread 325). The user interface 310 may improve a user experience by displaying messages 330-a, 330-b, 330-c, 330-d, and 330-e to a user even if the user is not associated with all of the messages 330 in the thread. For example, a user operating the user device 305 may not send or receive message 330-c. In an inbox for the user (e.g., an email inbox), the user may not be able to view message 330-c. In such cases, the user may perform redundant work and send a duplicate message (e.g., containing the same content as message 330-c) based on not seeing message 330-c and its context within the thread. However, by displaying a global view of the thread in the user interface 310, rather than displaying a user-specific view, the user device 305 may mitigate user inefficiencies and improve the user experience.

The user interface 310 may additionally support privacy rules or policies which may improve user experience. In some examples, a user may opt-out, not opt-in, or otherwise be excluded from a global message thread. For example, the user may be associated with message 330-d, and the user may opt out of the global message thread. An indication of message 330-d may be displayed via user interface 310 (e.g., based on metadata for the message 330-*d* or messages in response to message 330-*d*), but the contents of message 330-*d* and/or metadata associated with message 330-*d* may be removed, blurred, not persisted, or otherwise obfuscated to ensure the privacy of the user. Therefore, the user interface 310 may improve user experience through the support or enforcement of privacy policies.

The contents displayed in the user interface 310 may be generated based on a local application, a backend application, a web-based application, or some combination thereof. In some cases, the user device 310 may query a database (e.g., persisting information for the global thread in memory) for the messages 330 associated with a thread. Based on the messages 330 being stored in the database with an association to the thread identifier, the database may efficiently identify all of the messages 330 associated with the thread and may return these messages 330 in response to the query. This data structure (e.g., including thread identifier-based roots and message-based trees) may support low latency querying of messages 330 for a thread. Additionally, if a new message 330 is received at the database or a thread server corresponding to a thread currently being displayed in the user interface 310, the database or thread server may automatically push the new message 330 for display in the user interface 310. This automatic updating may support a real-time view of messages 330 in a thread, allowing a user to quickly identify new messages 330 even if the user is not included as the sender or a recipient of the new messages 330.

Figure 4:
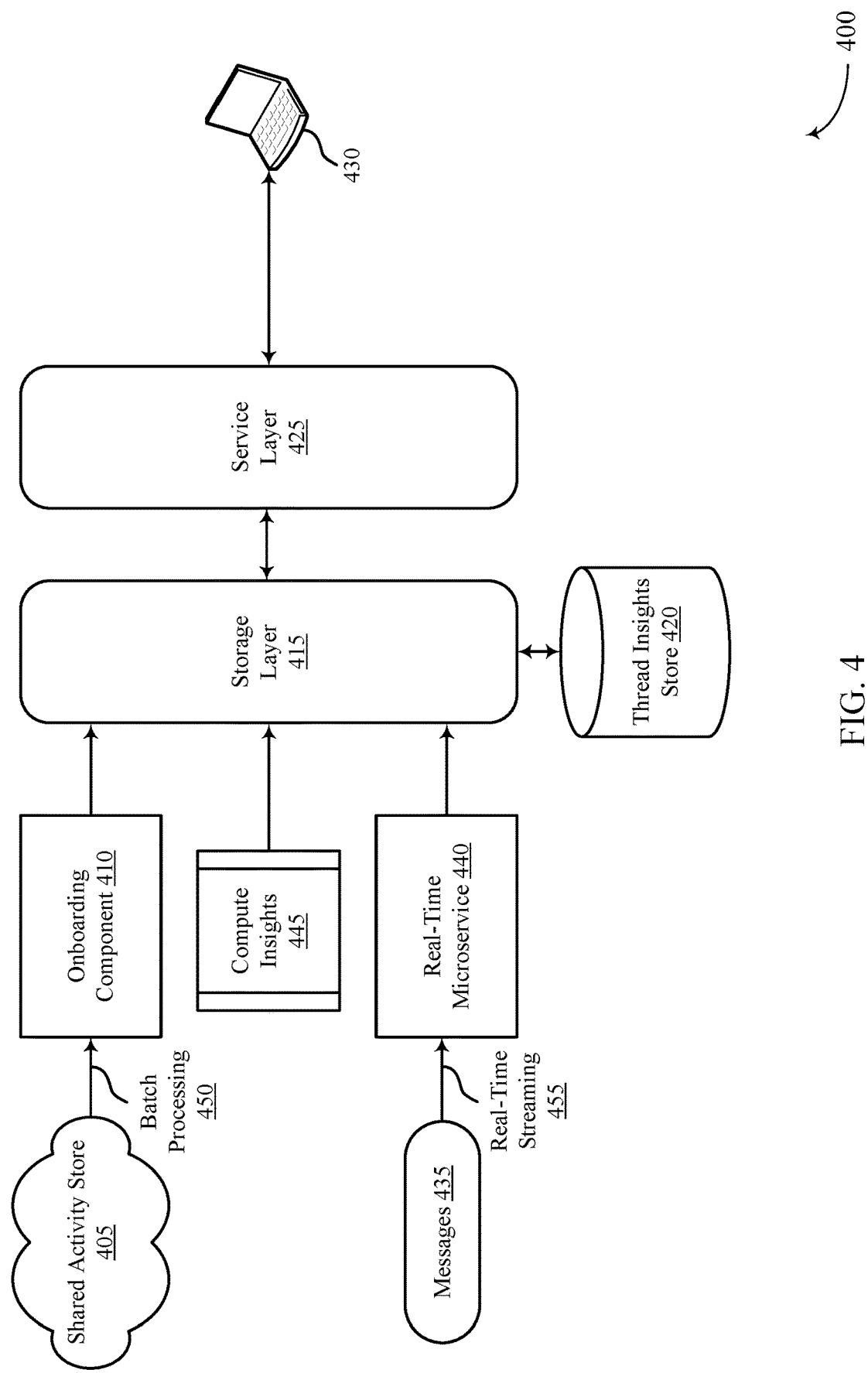
FIG. 4 illustrates an example of a threading platform that supports construction of global internet message threads in accordance with aspects of the present disclosure.

FIG. 4 illustrates an example of a threading platform 400 that supports construction of global internet message threads in accordance with aspects of the present disclosure. The threading platform 400 includes a shared activity store 405, an onboarding component 410, a storage layer 415, a service layer 425, and real-time microservices 440, which may be examples or components of one or more servers and/or cloud platforms as described with reference to FIGS. 1 and 2. The software threading platform 400 includes a user device 430 and messages 435. The user device 430 and/or messages 435 may be examples of or associated with cloud clients 105 or contacts 110 as described with reference to FIG. 1.

In some cases, the threading platform 400 may support the onboarding of a group and/or user. Group onboarding may support batch processing. For example, a policy, procedure, or law (e.g., the general data protection regulation (GDPR)) related to data associated with the group may change, and batch processing may support the rapid alteration and/or verification of the data associated with the group. In some examples, the data associated with the group may be stored in in shared activity store 405. The onboarding component 410 may read the data and/or store the data in the storage layer 415. The onboarding component 410 and/or the storage layer 415 may, in some examples, alter (e.g., obfuscate, encrypt, anonymize, etc.) the data in support of the policy, procedure or law.

In a particular example, a group (e.g., a tenant of a multi-tenant database system) may activate global threading. Prior to activation, communication messages stored for the group may not be stored with associations to any particular thread. The onboarding component 410 may perform bulk processing to retrieve the communication messages (e.g., from the shared activity store 405) and identify thread identifiers for each of the communication messages. The onboarding component 450 may perform batch processing 450 (e.g., based on available processing resources, as a background process, etc.) to reduce the overhead associated with activating global threading for previously stored communication messages. In some cases, information associated with the data (e.g., contexts, interpretations, insights, etc.) may be stored in thread insight store 420 with associations to the relevant thread identifier. The onboarding component 410 may batch processes, jobs, or queries to support the efficient processing and access to data associated with the storage layer 415. The threading platform 400 may additionally or alternatively support offline data processing to improve system efficiently and user experience. Once onboarding is complete (e.g., all historical communication messages for the group are stored with associations to the relevant thread identifiers) or during onboarding, the threading platform 400 may handle new communication messages using real-time streaming 455.

The threading platform 400 may support a rapid (e.g., real-time or pseudo real-time) message stream processing using a real-time microservice 440. Message stream processing may support on-the-fly thread-based storage and message context interpretation. For example, messages 435 may be processed by the real-time microservice 440 as the messages 435 enter or exit the threading platform 400 (e.g., as the messages 435 are transmitted or received). The real-time microservice 440 may improve user experience by providing real-time message notifications, reminders, or insights. The real-time microservice 440 may additionally or alternatively provide redundancy within the threading platform 400. For example, the real-time microservices 440 may be configured to provide a desired level of redundancy, thereby preventing a single point of failure and lowering the risk of failure and/or errors associated with the threading platform 400 (e.g., failing to store communication messages 435, failing to identify a relevant thread identifier, etc.).

A user device 430 may request (e.g., query) the service layer 425. For example, a user device 430 may transmit a query message to the service layer 425, and the query message may indicate a thread identifier. The query message may additionally or alternatively be associated with one or more communications messages, and the service layer 425 may provide a response to the user device 430. In some examples, the response may include information related to the thread identifier. For example, the service layer 425 may query the storage layer 415 based on the thread identifier and/or the query message. The storage layer 415 may provide the service layer 425 with a communication message and/or communication message insights in response to the query. For example, the threading platform 400 may compute insights 445 for a thread based on one or more of the communication messages associated with the same thread identifier. The service layer 425 may provide one or more communication messages and/or the insights associated with the one or more communication messages to the user device 430 (e.g., via an API, such as a CI API, a timeline API, or any other form of API).

In some cases, the threading platform 400 may support stateful global message threads. For example, the storage layer 415 or thread insight store 420 may contain data associated with global message threads that may correspond to the state of a global message thread. In some examples, the storage layer 415 may update the data (e.g., the state) associated with a global message thread in a dynamic fashion. The state of a global message thread may provide thread context that may be used in message and/or thread interpretation. In some examples, the state of the global message thread may be based on an NLP analysis of one or more communication messages stored with an association to the thread.

Based on the onboarding component 410 and the real-time microservice 440, the threading platform 400 may support real-time, historical, and onboarding implementations. The threading platform 400 may also support querying of timeline-based information for threads. For example, the threading platform 400 may support efficiently querying an entire thread out of the persistent memory, counts of messages in a thread, counts of insights associated with a thread, a leading edge (e.g., a most recent message) of a thread, a collapsed view of the thread, the different sub-threads of a thread, or any combination thereof.

Figure 5:
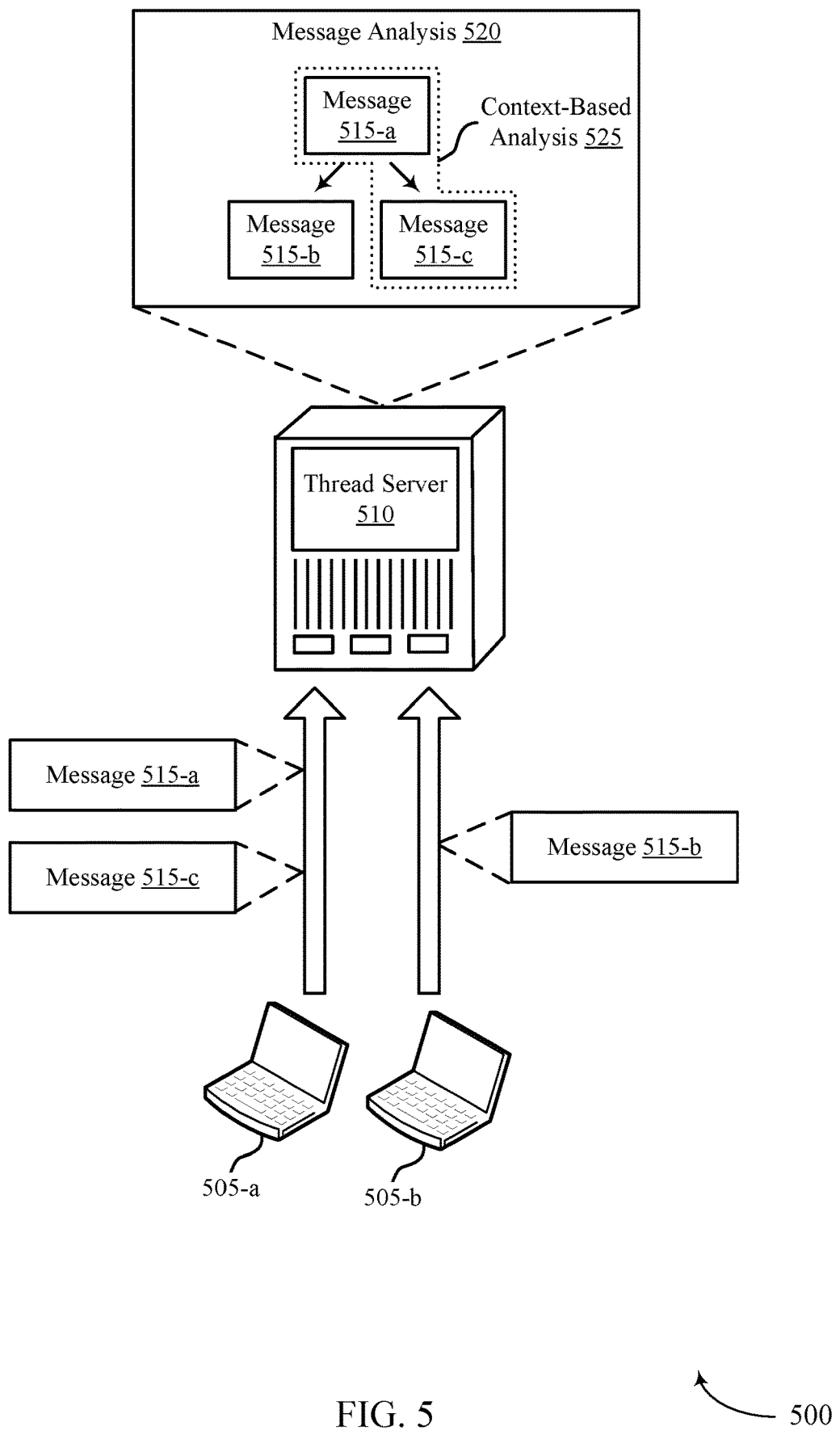
FIG. 5 illustrates an example of a message context derivation system that supports construction of global internet message threads in accordance with aspects of the present disclosure.

FIG. 5 illustrates an example of a message context derivation system 500 that supports construction of global internet message threads in accordance with aspects of the present disclosure. The message context derivation system 500 includes a number of user devices 505 and a thread server 510, which may be examples or components of one or more servers and/or cloud platforms as described with reference to FIGS. 1 through 4. For example, the user devices 505 may be examples of or associated with cloud clients 105, contacts 110, a user device 210, a user device 305, or a user device 430, and the thread server 510 may be an example or component of a data center 120, a cloud platform 115, a thread server 205, or a threading platform 400.

The thread server 510 may represent aspects of an application server, communication server, data processing server, database server, cloud-based server, server cluster, virtual machine, container, or some similar data processing device or system. The thread server 510 may communicate with other devices such as user device 505-a and/or user device 505-b. The thread server may receive a number of messages 515. In some examples, the messages 515 may be associated with a thread identifier, and messages 515 may be associated with a different set of user identifiers than other messages 515. For example, message 515-a may be sent from a first user to a second user, message 515-b may be sent from the second user to the first user in reply to message 515-a, and message 515-c may be sent from the first user to a third user in reply to message 515-a. In some cases, the thread server 510 may perform a message analysis 520 to determine context for one or more messages. For example, the thread server 510 may receive messages 515-a, 515-b, and 515-c and may determine the chronology of the received messages. In some examples, the determined chronology may be based on metadata associated with the messages (e.g., a timestamp indicating a message transmission time). The thread server 510 may additionally or alternatively determine that messages 515-a, 515-b, and 515-c are associated with the same thread identifier. In some examples, the thread server 510 may determine that the messages are associated with the same thread identifier based on metadata (e.g., a header value) associated with the messages. Determining information (e.g., message context, message chronology, message thread identifiers, etc.) based on metadata associated with messages may support real-time or pseudo real-time processing of messages.

In some cases, the thread server 510 may interpret (e.g., classify) one or more messages 515 based on context associated with the one or more messages. For example, the thread server 510 may interpret message 515-c based on the determined chronological context for the messages (e.g., in which message 515-c was transmitted after messages 515-b and 515-a). In some additional or alternative cases, the thread server may interpret or re-interpret message 515-b based on the determined chronological context (e.g., in which message 515-b was transmitted before message 515-c and after message 515-a). Interpreting messages with their chronological contexts may provide more accurate insights into the messages. For example, the thread server 510 may determine which messages and what types of messages are likely to receive a positive reply. In some cases, a global message thread may support broader message contexts than a system implementing user-specific message threads (e.g., an email inbox, where user-specific messages are displayed). For example, a global message thread context (e.g., a group-level scope, a group thread, a global thread, etc.) may provide a more insightful context than a user message thread context.

The message analysis 520 may identify messages (e.g., emails) that meet or exceed a risk threshold associated with an organizational group. For example, the organizational group may be associated with a risk threshold that corresponds to the flagging of messages (e.g., emails) sent to a user outside the organizational group. In some cases, messages sent from a user associated with the organizational group and/or an email account associated with the organizational group may be flagged. In some cases, a context related to the organizational group may be used to determine whether an email should be flagged. In some additional or alternative cases, the organizational group as well as or instead of the message may be flagged when the identified message exceeds or meets the risk threshold. Message and/or group flagging may reduce organizational risk.

In some cases, the message context derivation system 500 may support the creation and/or storing of data that may be used in a machine-learning model. For example, the thread server 510 may track data (e.g., message chronology, thread outcome, a number of messages sent in association with a message thread, etc.) associated with a global message thread. In some cases, the data associated with the global message thread may correspond to data features and/or data labels. For example, the outcome of a global message thread may correspond to a data label, and the context of a message may correspond to the features of a global message thread. Data features and data labels may be used in a machine-learning model to generate and/or improve system predictions, suggestions, notifications, warnings, or any combinations thereof.

In a specific example, the thread server 510 may analyze the global thread for messages 515-a, 515-b, and 515-c. For example, the thread server 510 may implement one or more rules (e.g., user-defined or machine-learned rules) to determine a scope for context-based analysis 525. The thread server 510 may receive message 515-c and may perform message analysis 520 to classify message 515-c. In some cases, the thread server 510 may analyze all messages 515 in a thread to determine the context for message 515-c. In other cases, the thread server 510 may analyze all messages 515 in a sub-thread of the thread to determine the context for message 515-c. In yet other cases, the thread server 510 may implement an N−1 context for context-based analysis 525, where a new message is analyzed in the context of its parent message (e.g., message 515-c is analyzed in the context of message 515-a). Additionally or alternatively, message 515-a may be analyzed—or re-analyzed—in the context of message 515-c (and, in some cases, in the context of one or more other messages 515 in the thread). In some examples, the context-based analysis 525 may be performed across sub-threads. For example, message 515-c may be analyzed in the context of other messages that are in reply to message 515-a, such as message 515-b. While the context-based analysis rules described herein provide some example rules, it is to be understood that other rules are possible and supported according to the described techniques.

The message analysis 520 may involve metadata analysis, NLP analysis, or some combination thereof. The text of the messages 515 may be analyzed (e.g., using keyword extraction or other NLP techniques) to determine insights about the messages 515 or classifications of the messages 515. The message context derivation system 500 may integrate a labeling system for labeling messages 515, sub-threads, or threads based on the message analysis 520. These labels may be stored in persistent memory or determined on-the-fly for message, sub-thread, or thread analysis. For example, the message analysis 520 may determine stateful thread insights that may be iterative and/or change over time. For example, a thread may be labeled with a particular state based on NLP of the messages 515 in the thread, where states could include "open," "closed," "requested," "delivered," "accepted," or some combination of these or other defined states. By labeling at the thread-level, as opposed to the message-level, the thread server 510 may establish conversational context that applies to more than singular emails. Additionally or alternatively, speech act labels applied to a thread may uncover patterns in business communications beyond singular emails. For example, the thread server 510 may perform speech act tagging, vectorization, and clustering (e.g., using a K-means algorithm) to determine clustered states of threads following speech act patterns. In some cases, the thread server 510 may generate thread summaries based on analysis of multiple (e.g., all) messages 515 in a thread.

An example of message-level labeling may involve determining if a message 515 includes an objection (e.g., an objection expressing a barrier preventing a sale). Performing the NLP analysis on multiple messages in a thread (e.g., rather than just the message of interest) may improve the accuracy of objection identification for the message of interest. In some cases, the message analysis 520 may involve machine-learned algorithms for deriving insights from message. For example, the thread server 510 may receive data points reflecting the objection taxonomy for an organization's messages, apply machine-learning (e.g., weakly supervised learning), and build a model that identifies an objection based on a new message and the new message's parent message. By including the context of other messages 515 within the thread for analyzing a target message 515, the message analysis 520 may enrich the information used for classifying the text of the target message 515.

Figure 6:
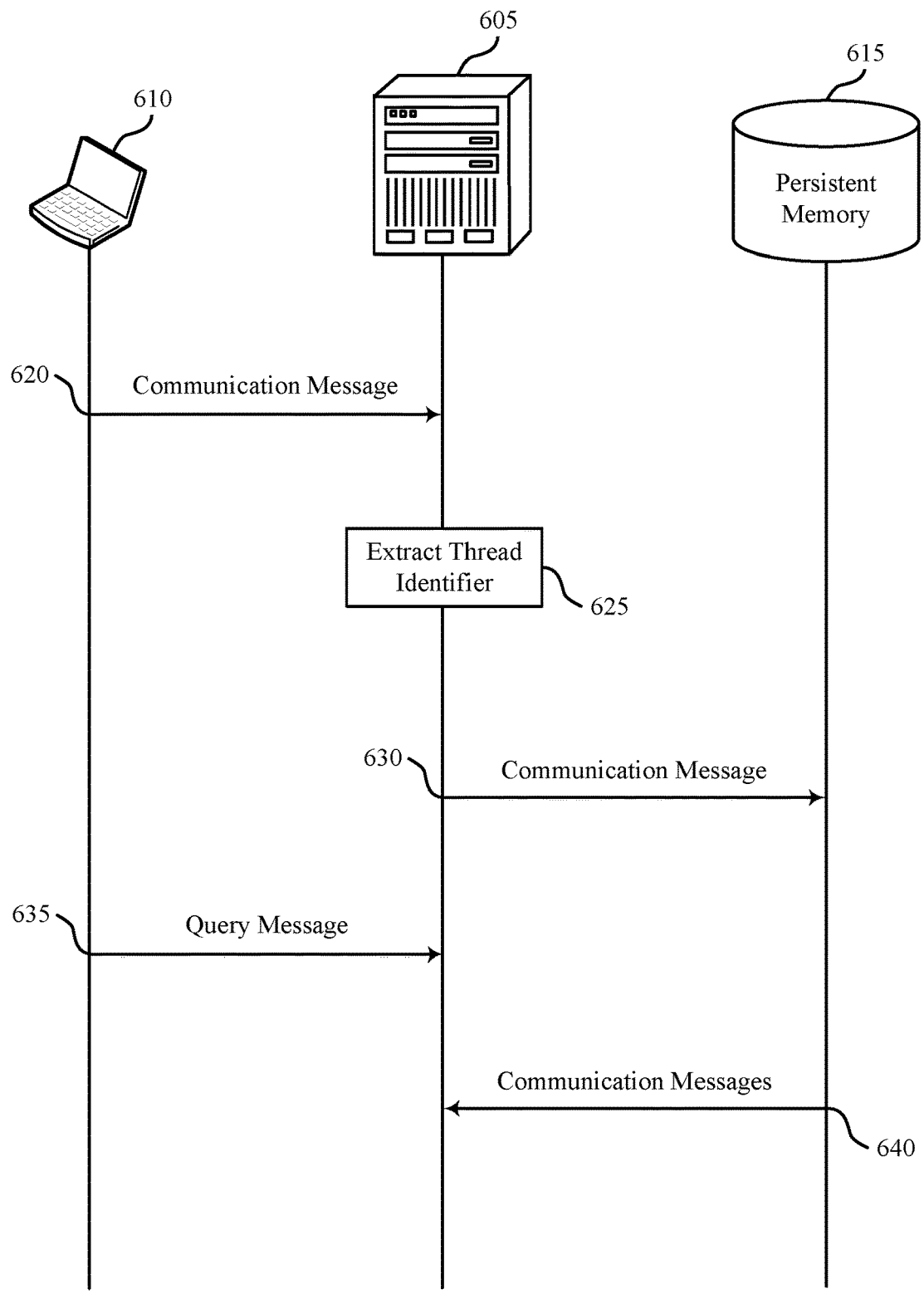
FIG. 6 illustrates an example of a process flow that supports construction of global internet message threads in accordance with aspects of the present disclosure.

FIG. 6 illustrates an example of a process flow 600 that supports construction of global internet message threads in accordance with aspects of the present disclosure. The process flow 600 includes a thread server 605, a user device 610, and persistent memory 615. These may be examples of the corresponding devices described with reference to FIGS. 1 through 5. The thread server 605 may construct global internet message threads that are stored in persistent memory 615 and displayed at the user device 610. Alternative examples of the following may be implemented, where some steps are performed in a different order than described or are not performed at all. In some cases, steps may include additional features not mentioned below, or further steps may be added.

At 620, the thread server 605 may receive a communication message that includes a first set of user identifiers associated with transmitting the communication message, receiving the communication message, or both. For example, the first set of user identifiers may correspond to the author of the communication message and each of the recipients of the communication message. In some cases, the communication message may be received from the user device 610. At 625, the thread server 625 may extract a thread identifier from the communication message. In some cases, the thread identifier may associate the communication message with one or more additional communication messages stored in persistent memory 615 (e.g., at a database system, a data store, a data lake, a cloud-based storage system, etc.). For example, the thread identifier may indicate that both the communication message and the one or more additional communication messages are part of a global message thread. The one or more additional communication messages may include a second of user identifiers associated with transmitting at least one of the one or more additional commutation messages, receiving at least one of the one or more additional communication messages, or both. For example, the communication message may be associated with a set of users that is different than a set of users associated with the one or more additional communication messages.

Extracting the thread identifier may involve parsing the communication message or metadata for the communication message. For example, the communication message may be an example of an internet message (e.g., an email, a calendar invite, etc.) in an internet message format (e.g., Request for Comments (RFC) 2822 internet message format). The parser may parse the internet message header to determine a references header field (e.g., a left-anchored first message identifier in the references header). This parsed value may correspond to the thread identifier for the communication message. In other cases, extracting the thread identifier may involve an NLP analysis of the communication message or a machine-learned analysis of the communication message (e.g., determining threads based on similar authors, recipients, subject lines, headers, etc.).

At 630, the thread server 605 may store the communication message and the thread identifier with an indication of the communication message in persistent memory 615. For example, the thread server 605 may store the communication message in a data structure (e.g., a tree) that is associated with the thread identifier. At 635, the thread server 605 may receive a query message from the user device 610 that indicates the thread identifier. This query message may be associated with a user identifier of the second set of user identifiers. However, the first set of user identifiers may not include this user identifier. For example, the user identifier may correspond to a user that is neither a recipient nor a sender of the communication message (although the user may be a sender or recipient of one or more other messages in the global message thread).

At 640, the thread server 605 may retrieve the communication message and the one or more additional commutation messages from the persistent memory 615. In some cases, the communication message and the one or more additional communication messages may be retrieved based on the query message indicating the thread identifier. For example, the thread server 605 may retrieve the communication messages that are associated with the thread. In some examples, the thread server 605 may retrieve all the communication messages that are associated with the thread identifier (e.g., a global thread identifier). For example, the thread server 605 may retrieve the communication message for the querying user even though the querying user is neither a recipient nor a sender of the communication message. Storing and/or retrieving communication messages based on a global thread identifier may reduce query latency, improve message retrieval speed, and allow for users across a team to view a thread of messages at a global-level, rather than a user-level. While email providers may store and display user-specific views of messages based on privacy constraints, the thread server 605 may support storing and displaying team-specific views of messages for improved collaboration, coordination, and insights.

Figure 7:
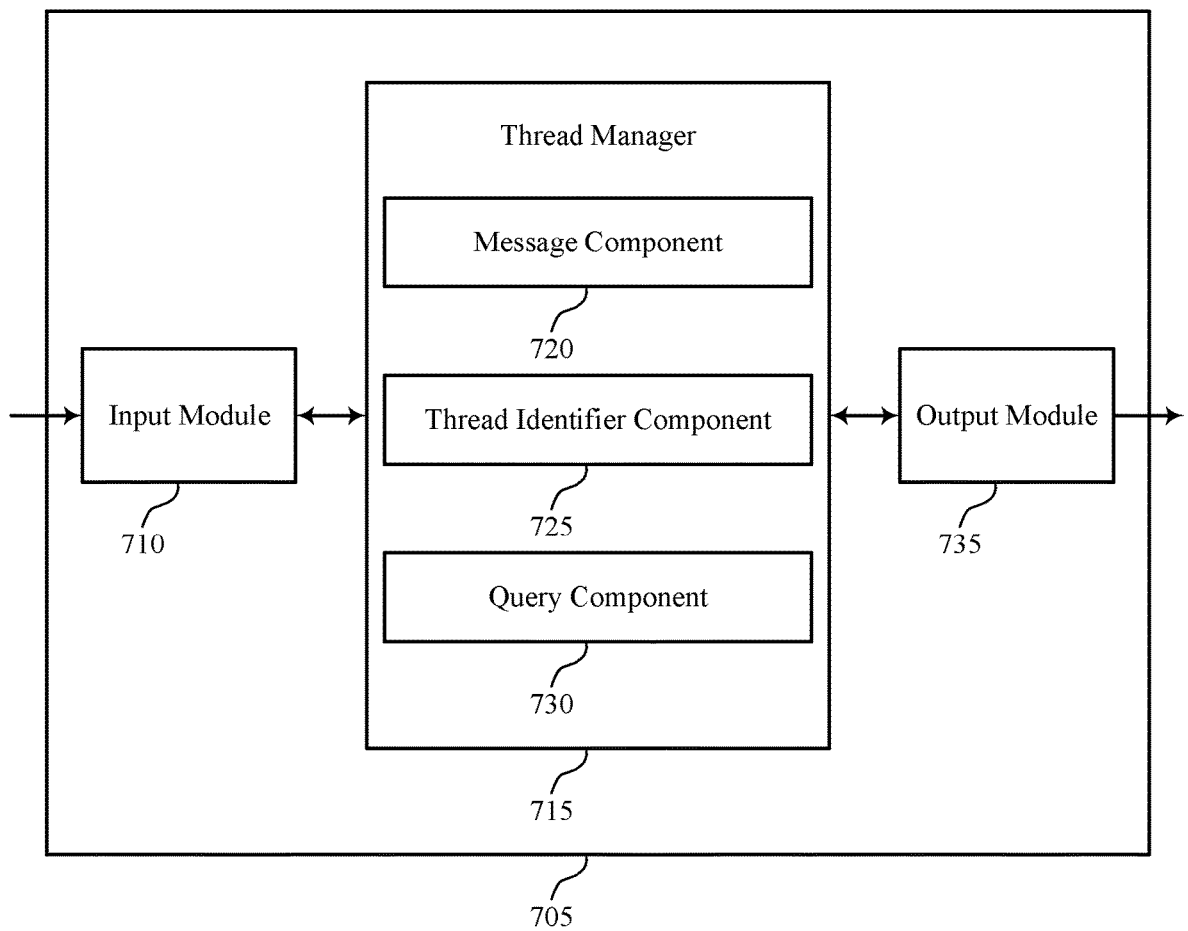
FIG. 7 shows a block diagram of an apparatus that supports construction of global internet message threads in accordance with aspects of the present disclosure.

FIG. 7 shows a block diagram 700 of an apparatus 705 that supports construction of global internet message threads in accordance with aspects of the present disclosure. The apparatus 705 may include an input module 710, a thread manager 715, and an output module 735. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the thread manager 715 to support construction of global internet message threads. In some cases, the input module 710 may be a component of an input/output (I/O) controller 915 as described with reference to FIG. 9.

The thread manager 715 may include a message component 720, a thread identifier component 725, and a query component 730. The thread manager 715 may be an example of aspects of the thread manager 805 or 910 described with reference to FIGS. 8 and 9.

The thread manager 715 and/or at least some of its various sub-components may be implemented in hardware, software executed by a processor, firmware, or any combination thereof. If implemented in software executed by a processor, the functions of the thread manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The thread manager 715 and/or at least some of its various sub-components may be physically located at various positions, including being distributed such that portions of functions are implemented at different physical locations by one or more physical devices. In some examples, the thread manager 715 and/or at least some of its various sub-components may be a separate and distinct component in accordance with various aspects of the present disclosure. In other examples, the thread manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The message component 720 may receive a communication message including a first set of user identifiers associated with transmitting the communication message, receiving the communication message, or both. The thread identifier component 725 may extract a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both.

The message component 720 may store, in the persistent memory, the communication message and the thread identifier with an indication of the communication message. The query component 730 may receive, from a user device associated with a user identifier of the second set of user identifiers, a query message indicating the thread identifier, where the first set of user identifiers does not include the user identifier. The message component 720 may retrieve, from the persistent memory and in response to the query message, the communication message and the one or more additional communication messages based on the query message indicating the thread identifier.

The output module 735 may manage output signals for the apparatus 705. For example, the output module 735 may receive signals from other components of the apparatus 705, such as the thread manager 715, and may transmit these signals to other components or devices. In some specific examples, the output module 735 may transmit output signals for display in a user interface, for storage in a database or data store, for further processing at a server or server cluster, or for any other processes at any number of devices or systems. In some cases, the output module 735 may be a component of an I/O controller 915 as described with reference to FIG. 9.

Figure 8:
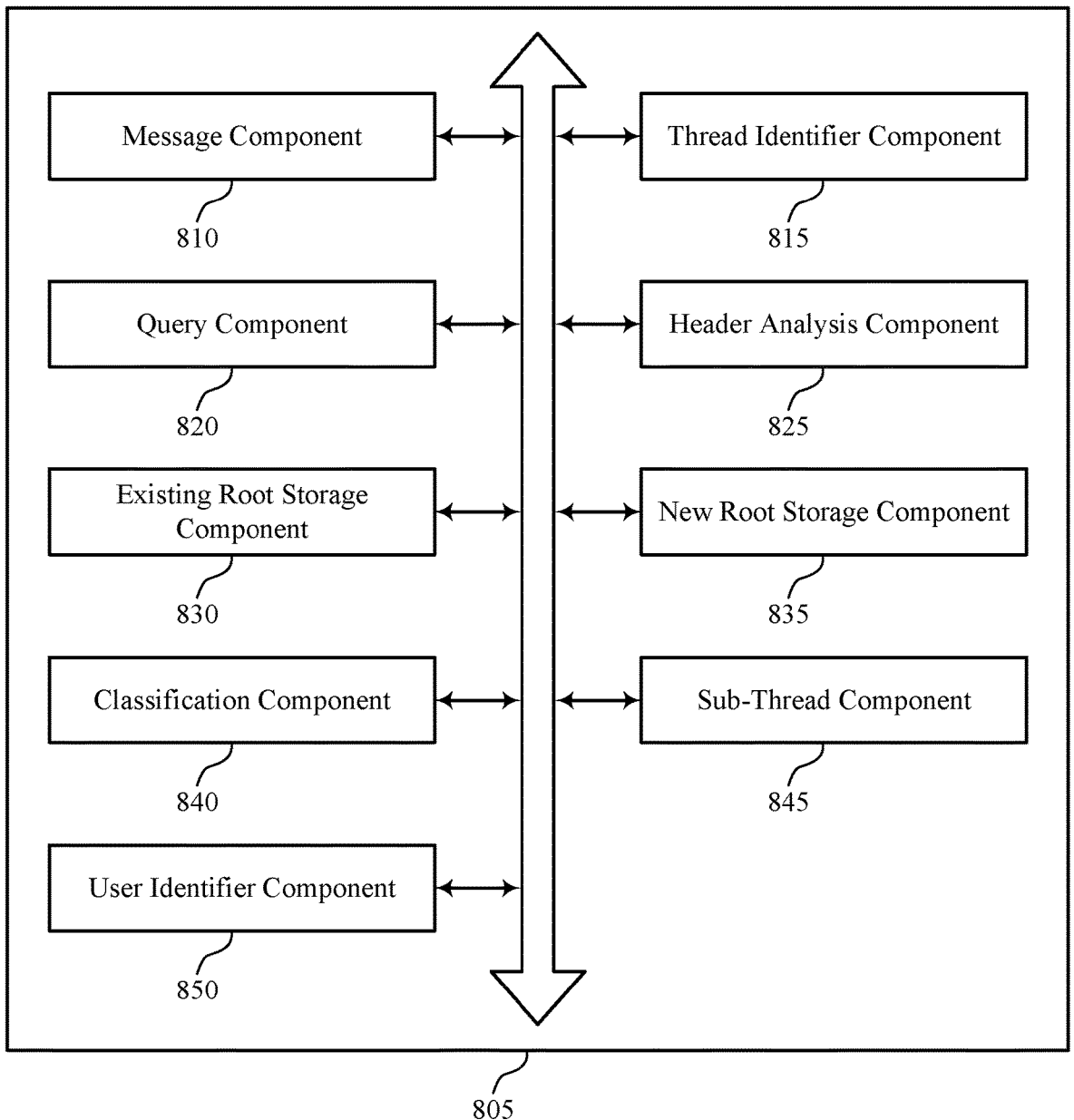
FIG. 8 shows a block diagram of a thread manager that supports construction of global internet message threads in accordance with aspects of the present disclosure.

FIG. 8 shows a block diagram 800 of a thread manager 805 that supports construction of global internet message threads in accordance with aspects of the present disclosure. The thread manager 805 may be an example of aspects of a thread manager 715 or a thread manager 910 described herein. The thread manager 805 may include a message component 810, a thread identifier component 815, a query component 820, a header analysis component 825, an existing root storage component 830, a new root storage component 835, a classification component 840, a sub-thread component 845, and a user identifier component 850. Each of these modules may communicate, directly or indirectly, with one another (e.g., via one or more buses).

The message component 810 may receive a communication message including a first set of user identifiers associated with transmitting the communication message, receiving the communication message, or both. In some cases, the first set of user identifiers includes an author of the communication message and each recipient of the communication message.

The thread identifier component 815 may extract a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both.

The message component 810 may store, in the persistent memory, the communication message and the thread identifier with an indication of the communication message. The query component 820 may receive, from a user device associated with a user identifier of the second set of user identifiers, a query message indicating the thread identifier, where the first set of user identifiers does not include the user identifier. The message component 810 may retrieve, from the persistent memory and in response to the query message, the communication message and the one or more additional communication messages based on the query message indicating the thread identifier. The user identifier component 850 may identify the first set of user identifiers. In some cases, the first set of user identifiers is a subset of the second set of user identifiers.

In some cases, extracting the thread identifier from the communication message involves the header analysis component 825 parsing a header of the communication message into one or more header fields. In some examples, the header analysis component 825 may determine the thread identifier based on a header field of the one or more header fields. For example, the communication message may be an internet message in an internet message format and the header field may be a references header field.

In some cases, storing the communication message and the thread identifier with an indication of the communication message may involve the existing root storage component 830 identifying, in the persistent memory, a stored set of communication messages associated with a root including the thread identifier, where the stored set of communication messages includes the one or more additional communication messages. In some examples, the existing root storage component 830 may upsert the communication message to the stored set of communication messages based on the thread identifier and the identifying.

The new root storage component 835 may receive an additional communication message. In some examples, the new root storage component 835 may extract an additional thread identifier from the additional communication message and may identify that the persistent memory does not include a root including the additional thread identifier. The new root storage component 835 may create a new root including the additional thread identifier based on the identifying and may store, in the persistent memory, the additional communication message associated with the new root.

In some examples, the thread identifier component 815 may retrieve a batch of communication messages from the persistent memory. In some examples, the thread identifier component 815 may extract one or more thread identifiers for the batch of communication messages and may store, in the persistent memory, the one or more thread identifiers, where each thread identifier of the one or more thread identifiers is stored with an indication of at least one communication message of the batch of communication messages based on the extracting.

In some examples, the message component 810 may order the communication message and the one or more additional communication messages according to a set of timestamps for the communication message and the one or more additional communication messages based on the retrieving. The classification component 840 may perform an NLP function on a set of communication messages of the communication message and the one or more additional communication messages based on the ordering. In some examples, the classification component 840 may determine a classification of the communication message based on performing the NLP function.

In some examples, the classification component 840 may update an additional classification of at least one communication message of the one or more additional communication messages based on performing the NLP function. In some examples, the classification component 840 may store, in the persistent memory, the classification of the communication message. Additionally or alternatively, the classification component 840 may transmit, to the user device in response to the query message, the classification of the communication message. In some examples, the message component 810 may select the set of communication messages for performing the NLP function based on the ordering, a sub-thread corresponding to the thread identifier, a proximity threshold to the communication message, or a combination thereof.

The sub-thread component 845 may determine a set of sub-threads corresponding to the thread identifier based on the ordering and a set of different sets of user identifiers associated with different communication messages of the communication message and the one or more additional communication messages. In some examples, the sub-thread component 845 may transmit, for display in a user interface of the user device in response to the query message, an indication of the set of sub-threads corresponding to the thread identifier. In some examples, the message component 810 may transmit, for display in a user interface of the user device in response to the query message, an indication of the communication message and the one or more additional communication messages based on the ordering.

In some examples, the message component 810 may perform an NLP function on the communication message and the one or more additional communication messages based on the retrieving. In some examples, the message component 810 may generate a summary message associated with the thread identifier based on performing the NLP function and may transmit, for display in a user interface of the user device in response to the query message, the summary message.

Figure 9:
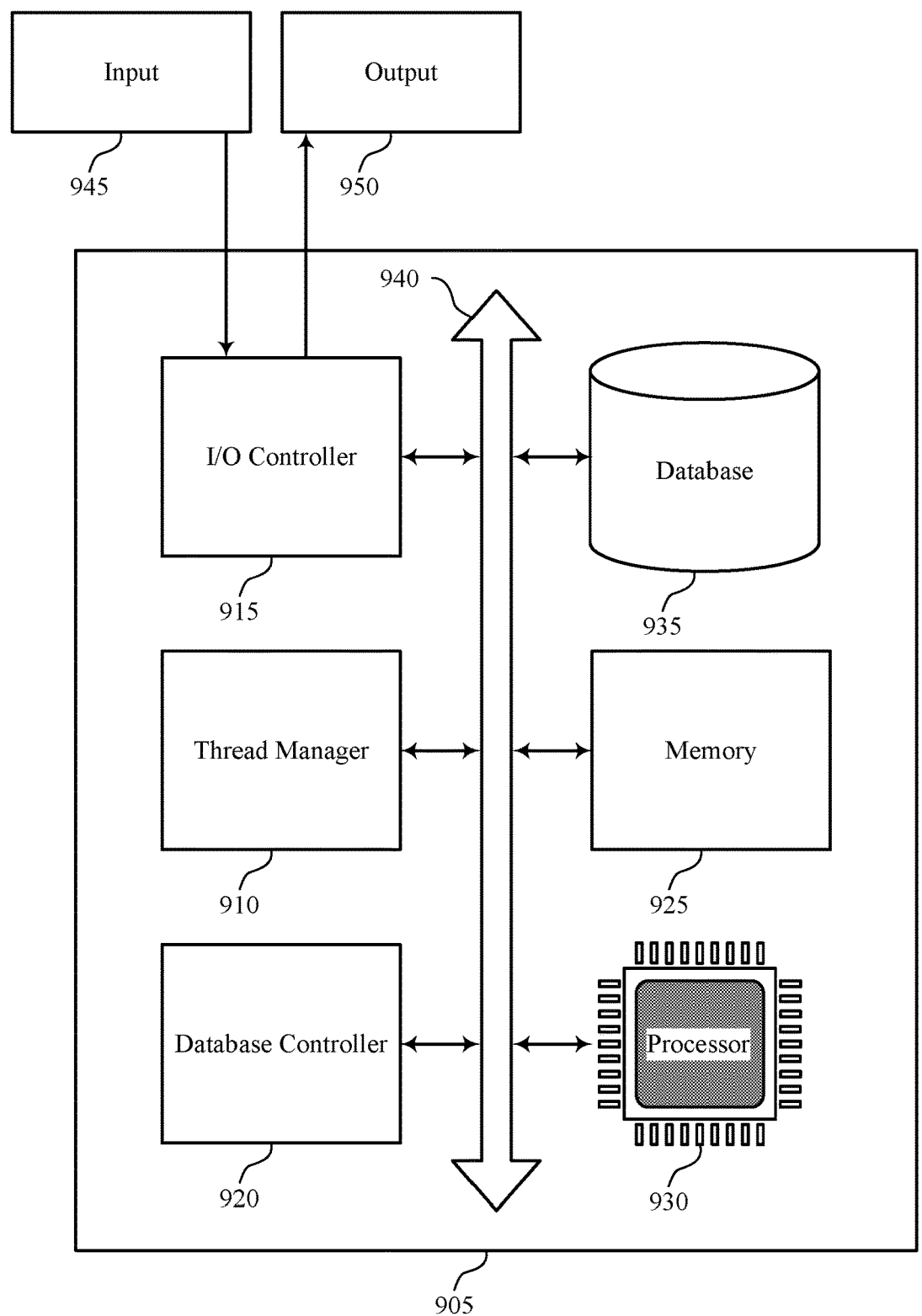
FIG. 9 shows a diagram of a system including a device that supports construction of global internet message threads in accordance with aspects of the present disclosure.

FIG. 9 shows a diagram of a system 900 including a device 905 that supports construction of global internet message threads in accordance with aspects of the present disclosure. The device 905 may be an example of or include the components of an application server or an apparatus 705 as described herein. The device 905 may include components for bi-directional data communications including components for transmitting and receiving communications, including a thread manager 910, an I/O controller 915, a database controller 920, memory 925, a processor 930, and a database 935. These components may be in electronic communication via one or more buses (e.g., bus 940).

The thread manager 910 may be an example of a thread manager 715 or 805 as described herein. For example, the thread manager 910 may perform any of the methods or processes described above with reference to FIGS. 7 and 8. In some cases, the thread manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting construction of global internet message threads).

Figure 10:
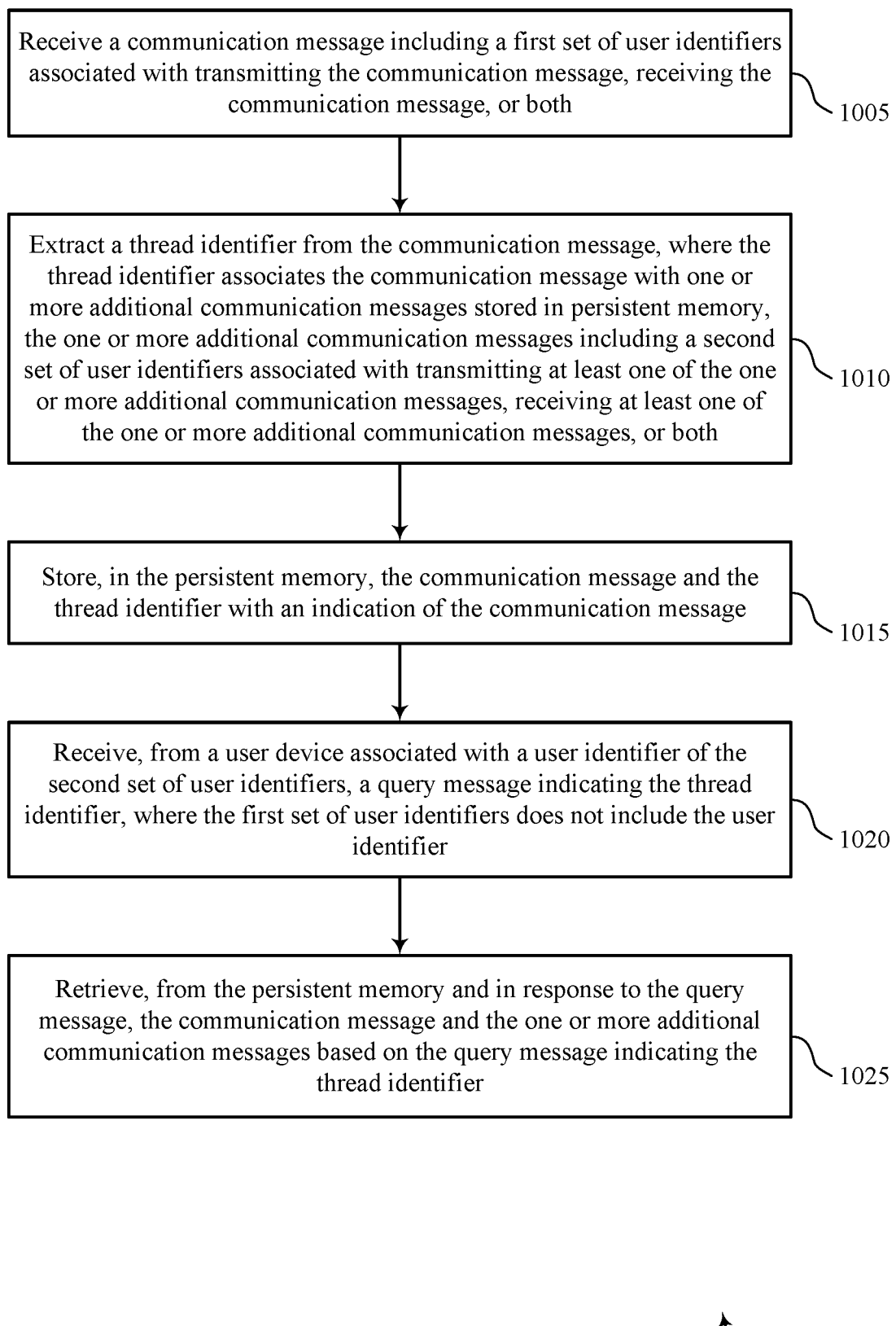
FIGS. 10 through 12 show flowcharts illustrating methods that support construction of global internet message threads in accordance with aspects of the present disclosure.

FIG. 10 shows a flowchart illustrating a method 1000 that supports construction of global internet message threads in accordance with aspects of the present disclosure. The operations of method 1000 may be implemented by an application server or its components as described herein. For example, the operations of method 1000 may be performed by a thread manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server may receive a communication message including a first set of user identifiers associated with transmitting the communication message, receiving the communication message, or both. The operations of 1005 may be performed according to the methods described herein. In some examples, aspects of the operations of 1005 may be performed by a message component as described with reference to FIGS. 7 through 9.

At 1010, the application server may extract a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both. The operations of 1010 may be performed according to the methods described herein. In some examples, aspects of the operations of 1010 may be performed by a thread identifier component as described with reference to FIGS. 7 through 9.

At 1015, the application server may store, in the persistent memory, the communication message and the thread identifier with an indication of the communication message. The operations of 1015 may be performed according to the methods described herein. In some examples, aspects of the operations of 1015 may be performed by a message component as described with reference to FIGS. 7 through 9.

At 1020, the application server may receive, from a user device associated with a user identifier of the second set of user identifiers, a query message indicating the thread identifier, where the first set of user identifiers does not include the user identifier. The operations of 1020 may be performed according to the methods described herein. In some examples, aspects of the operations of 1020 may be performed by a query component as described with reference to FIGS. 7 through 9.

At 1025, the application server may retrieve, from the persistent memory and in response to the query message, the communication message and the one or more additional communication messages based on the query message indicating the thread identifier. The operations of 1025 may be performed according to the methods described herein. In some examples, aspects of the operations of 1025 may be performed by a message component as described with reference to FIGS. 7 through 9.

Figure 11:
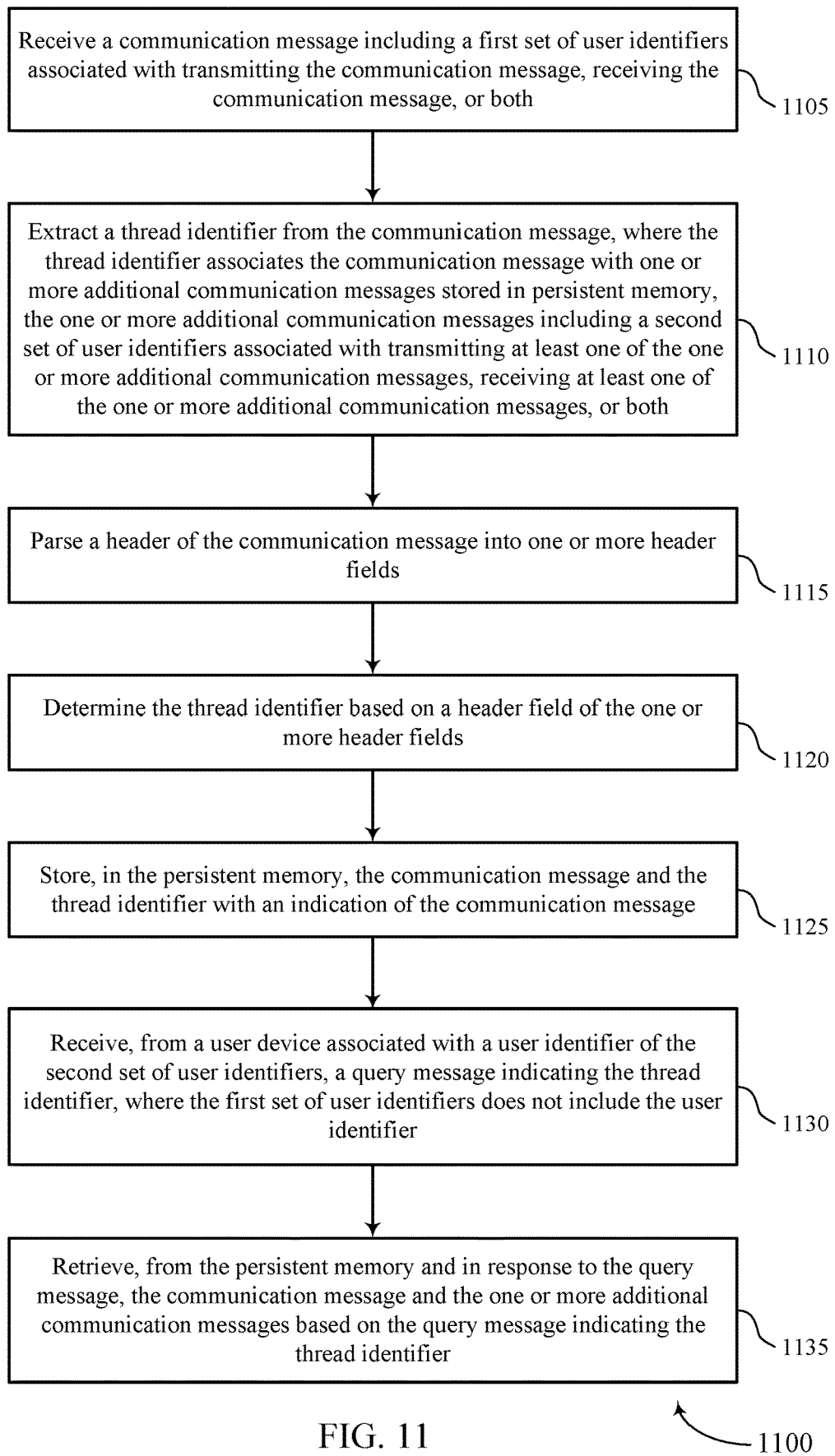

FIG. 11 shows a flowchart illustrating a method 1100 that supports construction of global internet message threads in accordance with aspects of the present disclosure. The operations of method 1100 may be implemented by an application server or its components as described herein. For example, the operations of method 1100 may be performed by a thread manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may receive a communication message including a first set of user identifiers associated with transmitting the communication message, receiving the communication message, or both. The operations of 1105 may be performed according to the methods described herein. In some examples, aspects of the operations of 1105 may be performed by a message component as described with reference to FIGS. 7 through 9.

At 1110, the application server may extract a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both. The operations of 1110 may be performed according to the methods described herein. In some examples, aspects of the operations of 1110 may be performed by a thread identifier component as described with reference to FIGS. 7 through 9.

For example, extracting the thread identifier may involve, at 1115, the application server parsing a header of the communication message into one or more header fields. The operations of 1115 may be performed according to the methods described herein. In some examples, aspects of the operations of 1115 may be performed by a header analysis component as described with reference to FIGS. 7 through 9.

Additionally, extracting the thread identifier may involve, at 1120, the application server determining the thread identifier based on a header field of the one or more header fields. The operations of 1120 may be performed according to the methods described herein. In some examples, aspects of the operations of 1120 may be performed by a header analysis component as described with reference to FIGS. 7 through 9.

At 1125, the application server may store, in the persistent memory, the communication message and the thread identifier with an indication of the communication message. The operations of 1125 may be performed according to the methods described herein. In some examples, aspects of the operations of 1125 may be performed by a message component as described with reference to FIGS. 7 through 9.

At 1130, the application server may receive, from a user device associated with a user identifier of the second set of user identifiers, a query message indicating the thread identifier, where the first set of user identifiers does not include the user identifier. The operations of 1130 may be performed according to the methods described herein. In some examples, aspects of the operations of 1130 may be performed by a query component as described with reference to FIGS. 7 through 9.

At 1135, the application server may retrieve, from the persistent memory and in response to the query message, the communication message and the one or more additional communication messages based on the query message indicating the thread identifier. The operations of 1135 may be performed according to the methods described herein. In some examples, aspects of the operations of 1135 may be performed by a message component as described with reference to FIGS. 7 through 9.

Figure 12:
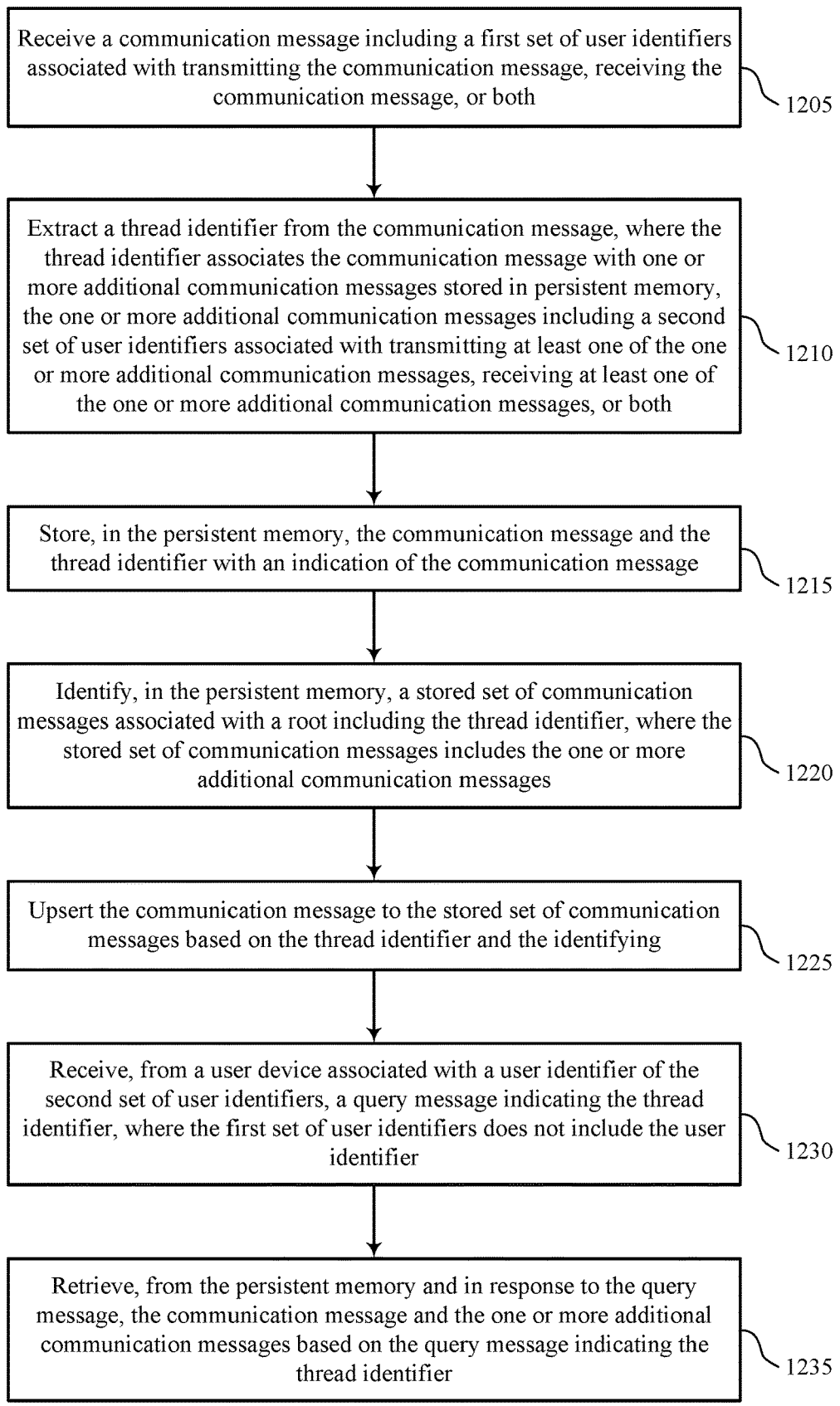

FIG. 12 shows a flowchart illustrating a method 1200 that supports construction of global internet message threads in accordance with aspects of the present disclosure. The operations of method 1200 may be implemented by an application server or its components as described herein. For example, the operations of method 1200 may be performed by a thread manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may receive a communication message including a first set of user identifiers associated with transmitting the communication message, receiving the communication message, or both. The operations of 1205 may be performed according to the methods described herein. In some examples, aspects of the operations of 1205 may be performed by a message component as described with reference to FIGS. 7 through 9.

At 1210, the application server may extract a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both. The operations of 1210 may be performed according to the methods described herein. In some examples, aspects of the operations of 1210 may be performed by a thread identifier component as described with reference to FIGS. 7 through 9.

At 1215, the application server may store, in the persistent memory, the communication message and the thread identifier with an indication of the communication message. The operations of 1215 may be performed according to the methods described herein. In some examples, aspects of the operations of 1215 may be performed by a message component as described with reference to FIGS. 7 through 9.

For example, storing the communication message in the persistent memory may involve, at 1220, the application server identifying, in the persistent memory, a stored set of communication messages associated with a root including the thread identifier, where the stored set of communication messages includes the one or more additional communication messages. The operations of 1220 may be performed according to the methods described herein. In some examples, aspects of the operations of 1220 may be performed by a storage component as described with reference to FIGS. 7 through 9.

Additionally, storing the communication message in the persistent memory may involve, at 1225, the application server upserting the communication message to the stored set of communication messages based on the thread identifier and the identifying. The operations of 1225 may be performed according to the methods described herein. In some examples, aspects of the operations of 1225 may be performed by a storage component as described with reference to FIGS. 7 through 9.

At 1230, the application server may receive, from a user device associated with a user identifier of the second set of user identifiers, a query message indicating the thread identifier, where the first set of user identifiers does not include the user identifier. The operations of 1230 may be performed according to the methods described herein. In some examples, aspects of the operations of 1230 may be performed by a query component as described with reference to FIGS. 7 through 9.

At 1235, the application server may retrieve, from the persistent memory and in response to the query message, the communication message and the one or more additional communication messages based on the query message indicating the thread identifier. The operations of 1235 may be performed according to the methods described herein. In some examples, aspects of the operations of 1235 may be performed by a message component as described with reference to FIGS. 7 through 9.

A method for persistent storage of global communication message information is described. The method may include receiving a communication message including a first set of user identifiers associated with transmitting the communication message, receiving the communication message, or both; extracting a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both; storing, in the persistent memory, the communication message and the thread identifier with an indication of the communication message; receiving, from a user device associated with a user identifier of the second set of user identifiers, a query message indicating the thread identifier, where the first set of user identifiers does not include the user identifier; and retrieving, from the persistent memory and in response to the query message, the communication message and the one or more additional communication messages based on the query message indicating the thread identifier.

An apparatus for persistent storage of global communication message information is described. The apparatus may include a processor, memory coupled with the processor, and instructions stored in the memory. The instructions may be executable by the processor to cause the apparatus to receive a communication message including a first set of user identifiers associated with transmitting the communication message, receiving the communication message, or both; extract a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both; store, in the persistent memory, the communication message and the thread identifier with an indication of the communication message; receive, from a user device associated with a user identifier of the second set of user identifiers, a query message indicating the thread identifier, where the first set of user identifiers does not include the user identifier; and retrieve, from the persistent memory and in response to the query message, the communication message and the one or more additional communication messages based on the query message indicating the thread identifier.

Another apparatus for persistent storage of global communication message information is described. The apparatus may include means for receiving a communication message including a first set of user identifiers associated with transmitting the communication message, receiving the communication message, or both; means for extracting a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both; means for storing, in the persistent memory, the communication message and the thread identifier with an indication of the communication message; means for receiving, from a user device associated with a user identifier of the second set of user identifiers, a query message indicating the thread identifier, where the first set of user identifiers does not include the user identifier; and means for retrieving, from the persistent memory and in response to the query message, the communication message and the one or more additional communication messages based on the query message indicating the thread identifier.

A non-transitory computer-readable medium storing code for persistent storage of global communication message information is described. The code may include instructions executable by a processor to receive a communication message including a first set of user identifiers associated with transmitting the communication message, receiving the communication message, or both; extract a thread identifier from the communication message, where the thread identifier associates the communication message with one or more additional communication messages stored in persistent memory, the one or more additional communication messages including a second set of user identifiers associated with transmitting at least one of the one or more additional communication messages, receiving at least one of the one or more additional communication messages, or both; store, in the persistent memory, the communication message and the thread identifier with an indication of the communication message; receive, from a user device associated with a user identifier of the second set of user identifiers, a query message indicating the thread identifier, where the first set of user identifiers does not include the user identifier; and retrieve, from the persistent memory and in response to the query message, the communication message and the one or more additional communication messages based on the query message indicating the thread identifier.

In some examples of the method, apparatuses, and non-transitory computer-readable medium described herein, extracting the thread identifier from the communication message may include operations, features, means, or instructions for parsing a header of the communication message into one or more header fields and determining the thread identifier based on a header field of the one or more header fields.

In some examples of the method, apparatuses, and non-transitory computer-readable medium described herein, the communication message includes an internet message in an internet message format, and the header field includes a references header field.

In some examples of the method, apparatuses, and non-transitory computer-readable medium described herein, storing the communication message and the thread identifier with an indication of the communication message may include operations, features, means, or instructions for identifying, in the persistent memory, a stored set of communication messages associated with a root including the thread identifier, where the stored set of communication messages includes the one or more additional communication messages, and upserting the communication message to the stored set of communication messages based on the thread identifier and the identifying.

Some examples of the method, apparatuses, and non-transitory computer-readable medium described herein may further include operations, features, means, or instructions for receiving an additional communication message, extracting an additional thread identifier from the additional communication message, identifying that the persistent memory does not include a root including the additional thread identifier, creating a new root including the additional thread identifier based on the identifying, and storing, in the persistent memory, the additional communication message associated with the new root.

Some examples of the method, apparatuses, and non-transitory computer-readable medium described herein may further include operations, features, means, or instructions for retrieving a batch of communication messages from the persistent memory, extracting one or more thread identifiers for the batch of communication messages, and storing, in the persistent memory, the one or more thread identifiers, where each thread identifier of the one or more thread identifiers may be stored with an indication of at least one communication message of the batch of communication messages based on the extracting.

Some examples of the method, apparatuses, and non-transitory computer-readable medium described herein may further include operations, features, means, or instructions for ordering the communication message and the one or more additional communication messages according to a set of timestamps for the communication message and the one or more additional communication messages based on the retrieving.

Some examples of the method, apparatuses, and non-transitory computer-readable medium described herein may further include operations, features, means, or instructions for performing an NLP function on a set of communication messages of the communication message and the one or more additional communication messages based on the ordering and determining a classification of the communication message based on performing the NLP function.

Some examples of the method, apparatuses, and non-transitory computer-readable medium described herein may further include operations, features, means, or instructions for updating an additional classification of at least one communication message of the one or more additional communication messages based on performing the NLP function.

Some examples of the method, apparatuses, and non-transitory computer-readable medium described herein may further include operations, features, means, or instructions for storing, in the persistent memory, the classification of the communication message.

Some examples of the method, apparatuses, and non-transitory computer-readable medium described herein may further include operations, features, means, or instructions for transmitting, to the user device in response to the query message, the classification of the communication message.

Some examples of the method, apparatuses, and non-transitory computer-readable medium described herein may further include operations, features, means, or instructions for selecting the set of communication messages for performing the NLP function based on the ordering, a sub-thread corresponding to the thread identifier, a proximity threshold to the communication message, or a combination thereof.

Some examples of the method, apparatuses, and non-transitory computer-readable medium described herein may further include operations, features, means, or instructions for determining a set of sub-threads corresponding to the thread identifier based on the ordering and a set of different sets of user identifiers associated with different communication messages of the communication message and the one or more additional communication messages.

Some examples of the method, apparatuses, and non-transitory computer-readable medium described herein may further include operations, features, means, or instructions for transmitting, for display in a user interface of the user device in response to the query message, an indication of the set of sub-threads corresponding to the thread identifier.

Some examples of the method, apparatuses, and non-transitory computer-readable medium described herein may further include operations, features, means, or instructions for transmitting, for display in a user interface of the user device in response to the query message, an indication of the communication message and the one or more additional communication messages based on the ordering.

Some examples of the method, apparatuses, and non-transitory computer-readable medium described herein may further include operations, features, means, or instructions for performing an NLP function on the communication message and the one or more additional communication messages based on the retrieving, generating a summary message associated with the thread identifier based on performing the NLP function, and transmitting, for display in a user interface of the user device in response to the query message, the summary message.

In some examples of the method, apparatuses, and non-transitory computer-readable medium described herein, the first set of user identifiers includes an author of the communication message and each recipient of the communication message.

In some examples of the method, apparatuses, and non-transitory computer-readable medium described herein, the first set of user identifiers is a subset of the second set of user identifiers.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for persistent storage of global communication message information, comprising:
  receiving a communication message comprising an internet message in an internet message format and a first set of user identifiers associated with an author of the communication message, a recipient of the communication message, or both;
  extracting and storing a thread identifier from the communication message, wherein the thread identifier associates the communication message with one or more additional communication messages stored in persistent memory, the one or more additional communication messages comprising a second set of user identifiers associated with an author of at least one of the one or more additional communication messages, a recipient of at least one of the one or more additional communication messages, or both;
  identifying, in the persistent memory, a stored set of communication messages associated with a root comprising the thread identifier, wherein the stored set of communication messages comprises the one or more additional communication messages;
  upserting the communication message to the stored set of communication messages based at least in part on the thread identifier and the identifying;
  storing, in the persistent memory, the communication message based at least in part on the upserting;
  receiving, from a user device associated with a user identifier, a query message indicating the thread identifier, wherein the second set of user identifiers comprises the user identifier and the first set of user identifiers does not comprise the user identifier; and
  retrieving, from the persistent memory and in response to the query message, the communication message and the one or more additional communication messages based at least in part on the query message indicating the thread identifier.

2. The method of claim 1, wherein extracting the thread identifier from the communication message comprises:
  parsing a header of the communication message into one or more header fields; and
  determining the thread identifier based at least in part on a header field of the one or more header fields.

3. The method of claim 2, wherein:
  the header field comprises a references header field.

4. The method of claim 1, further comprising:
  receiving an additional communication message;
  extracting an additional thread identifier from the additional communication message;
  identifying that the persistent memory does not include a root comprising the additional thread identifier;
  creating a new root comprising the additional thread identifier based at least in part on the identifying; and
  storing, in the persistent memory, the additional communication message associated with the new root.

5. The method of claim 1, further comprising:
  retrieving a batch of communication messages from the persistent memory;
  extracting one or more thread identifiers for the batch of communication messages; and
  storing, in the persistent memory, the one or more thread identifiers, wherein at least one communication message of the batch of communication messages is stored in the persistent memory with an association to each thread identifier of the one or more thread identifiers.

6. The method of claim 1, further comprising:
  ordering the communication message and the one or more additional communication messages according to a set of timestamps for the communication message and the one or more additional communication messages based at least in part on the retrieving.

7. The method of claim 6, further comprising:
  performing a natural language processing function on a plurality of communication messages comprising the communication message and at least one of the one or more additional communication messages based at least in part on the ordering; and determining a classification of the communication message based at least in part on performing the natural language processing function.

8. The method of claim 7, further comprising:
updating an additional classification of at least one communication message of the one or more additional communication messages based at least in part on performing the natural language processing function.

9. The method of claim 7, further comprising:
storing, in the persistent memory, the classification of the communication message.

10. The method of claim 7, further comprising:
transmitting, to the user device in response to the query message, the classification of the communication message.

11. The method of claim 7, further comprising:
selecting the plurality of communication messages for performing the natural language processing function based at least in part on the ordering, a sub-thread corresponding to the thread identifier, a proximity threshold to the communication message, or a combination thereof.

12. The method of claim 6, further comprising:
determining a plurality of sub-threads corresponding to the thread identifier based at least in part on the ordering and a plurality of different sets of user identifiers associated with different communication messages of the communication message and the one or more additional communication messages.

13. The method of claim 12, further comprising:
transmitting, for display in a user interface of the user device in response to the query message, an indication of the plurality of sub-threads corresponding to the thread identifier.

14. The method of claim 6, further comprising:
transmitting, for display in a user interface of the user device in response to the query message, an indication of the communication message and the one or more additional communication messages based at least in part on the ordering.

15. The method of claim 1, further comprising:
performing a natural language processing function on the communication message and the one or more additional communication messages based at least in part on the retrieving;
generating a summary message associated with the thread identifier based at least in part on performing the natural language processing function; and
transmitting, for display in a user interface of the user device in response to the query message, the summary message.

16. The method of claim 1, wherein the first set of user identifiers comprises the author of the communication message and each recipient of the communication message.

17. The method of claim 1, wherein the first set of user identifiers comprises a subset of the second set of user identifiers.

18. An apparatus for persistent storage of global communication message information, comprising:
a processor;
memory coupled with the processor; and
instructions stored in the memory and executable by the processor to cause the apparatus to:

receive a communication message comprising an internet message in an internet message format and a first set of user identifiers associated with an author of the communication message, a recipient of the communication message, or both;
extract and store a thread identifier from the communication message, wherein the thread identifier associates the communication message with one or more additional communication messages stored in persistent memory, the one or more additional communication messages comprising a second set of user identifiers associated with an author of at least one of the one or more additional communication messages, a recipient of at least one of the one or more additional communication messages, or both;
identify, in the persistent memory, a stored set of communication messages associated with a root comprising the thread identifier, wherein the stored set of communication messages comprises the one or more additional communication messages;
upsert the communication message to the stored set of communication messages based at least in part on the thread identifier and the identifying;
store, in the persistent memory, the communication message based at least in part on the upserting;
receive, from a user device associated with a user identifier, a query message indicating the thread identifier, wherein the second set of user identifiers comprises the user identifier and the first set of user identifiers does not comprise the user identifier; and
retrieve, from the persistent memory and in response to the query message, the communication message and the one or more additional communication messages based at least in part on the query message indicating the thread identifier.

19. A non-transitory computer-readable medium storing code for persistent storage of global communication message information, the code comprising instructions executable by a processor to:
receive a communication message comprising an internet message in an internet message format and a first set of user identifiers associated with an author of the communication message, a recipient of the communication message, or both;
extract and store a thread identifier from the communication message, wherein the thread identifier associates the communication message with one or more additional communication messages stored in persistent memory, the one or more additional communication messages comprising a second set of user identifiers associated with an author of at least one of the one or more additional communication messages, a recipient of at least one of the one or more additional communication messages, or both;
identify, in the persistent memory, a stored set of communication messages associated with a root comprising the thread identifier, wherein the stored set of communication messages comprises the one or more additional communication messages;
upsert the communication message to the stored set of communication messages based at least in part on the thread identifier and the identifying;
store, in the persistent memory, the communication message based at least in part on the upserting;
receive, from a user device associated with a user identifier, a query message indicating the thread identifier, wherein the second set of user identifiers comprises the user identifier and the first set of user identifiers does not comprise the user identifier; and retrieve, from the persistent memory and in response to the query message, the communication message and the one or more additional communication messages based at least in part on the query message indicating the thread identifier.

\* \* \* \* \*